United States Patent
Kamon et al.

(10) Patent No.: US 11,850,737 B2
(45) Date of Patent: Dec. 26, 2023

(54) JOINT STRUCTURE FOR ROBOT

(71) Applicant: KAWASAKI JUKOGYO KABUSHIKI KAISHA, Kobe (JP)

(72) Inventors: Masayuki Kamon, Kobe (JP); So Yukizaki, Kobe (JP); Junichi Karasuyama, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/638,986

(22) PCT Filed: Sep. 1, 2020

(86) PCT No.: PCT/JP2020/033139
§ 371 (c)(1),
(2) Date: Feb. 28, 2022

(87) PCT Pub. No.: WO2021/045063
PCT Pub. Date: Mar. 11, 2021

(65) Prior Publication Data
US 2022/0266459 A1  Aug. 25, 2022

(30) Foreign Application Priority Data
Sep. 2, 2019  (JP) .................. 2019-159742

(51) Int. Cl.
*B25J 17/00* (2006.01)
*B25J 17/02* (2006.01)
*B25J 9/10* (2006.01)

(52) U.S. Cl.
CPC .......... *B25J 17/0258* (2013.01); *B25J 9/103* (2013.01)

(58) Field of Classification Search
CPC ........ B25J 9/102; B25J 17/02; B25J 17/0258; B25J 9/103
USPC .......................................................... 901/29
See application file for complete search history.

(56) References Cited

U.S. PATENT DOCUMENTS 2,680,972 A   6/1954  Tone et al.

FOREIGN PATENT DOCUMENTS

| CN | 104942822 A | 9/2015 |
| JP | H06-197492 A | 7/1994 |
| JP | 1995-024771 A | 1/1995 |
| JP | 2017-100239 A | 6/2017 |
| SU | 598749 | * 3/1978 |
| WO | WO 86/05137 | * 9/1986 |

* cited by examiner

*Primary Examiner* — William C Joyce
(74) *Attorney, Agent, or Firm* — METROLEX IP LAW GROUP, PLLC

(57) ABSTRACT

A joint structure for a robot according to the present disclosure includes a first link and a second link rotatably coupled to each other via a joint part. The joint part has a first rotary member disposed so that an axial center thereof is oriented in a first direction and connected to the first link, a pair of second rotary members disposed so that an axial center thereof is oriented in a second direction perpendicular to the first direction, and so as to engage with the first rotary member, and a shaft member formed in a T-shape and having a first shank and a pair of second shanks. The joint structure further includes a pressing member connected to the second shank and configured to press the second rotary member inwardly.

16 Claims, 2 Drawing Sheets

JOINT STRUCTURE FOR ROBOT

CROSS-REFERENCE TO RELATED APPLICATIONS

This application is a national stage entry of International Application No. PCT/JP2020/033139 filed on Sep. 1, 2020, which claims priority based on the Article 8 of Patent Cooperation Treaty from the prior Japanese Patent Application No 2019-159742, filed on Sep. 2, 2019, the entire contents of all of which are incorporated herein by reference.

TECHNICAL FIELD

The present disclosure relates to a joint structure for a robot.

BACKGROUND ART

Manipulator devices used for a painting work are known, which are provided with a nozzle. The nozzle rotates with two degrees of freedom, and has a gear part which is sandwiched between two bevel gears and is disposed at a base body so as to mesh with the bevel gears (for example, see Patent Document 1).

REFERENCE DOCUMENT OF CONVENTIONAL ART

Patent Document

[Patent Document 1] JP1995-024771A

DESCRIPTION OF THE DISCLOSURE

Problem(s) to be Solved by the Disclosure

However, according to the manipulator device disclosed in Patent Document 1, it does not disclose how the two bevel gears and the gear part are attached to the base body. Moreover, since a thrust is applied to the bevel gears in the axial direction, the engagement between the bevel gears and the gear part becomes loose, and therefore, wobbles (rattling) may occur.

The present disclosure is made in view of solving the above-described conventional problems, and one purpose thereof is to provide a joint structure for a robot, which, in a differential gear device, by pressing a second rotary member against a second shank with a pressing member so that a pair of second rotary members may approach each other, can eliminate wobbles or can suppress generation of the wobbles, even if the wobbles occur.

SUMMARY OF THE DISCLOSURE

In order to solve the conventional problem, a joint structure for a robot according to the present disclosure includes a first link and a second link rotatably coupled to each other via a joint part, and a first actuator and a second actuator. The joint part has a first rotary member disposed so that an axial center thereof is oriented in a first direction and connected to the first link, a pair of second rotary members disposed so that an axial center thereof is oriented in a second direction perpendicular to the first direction, and so as to engage with the first rotary member, and a shaft member having a first shank and a pair of second shanks. The first actuator transmits a rotational movement thereof to one of the second rotary members via a rotary transmitting member. The second actuator transmits a rotational movement thereof to the other second rotary member via the rotary transmitting member. The shaft member is formed so that the first shank is oriented in the first direction and the pair of second shanks are oriented in the second direction. The first rotary member is disposed so that the first shank of the shaft member is inserted therein. The pair of second rotary members are disposed so that they oppose to each other and the second shank of the shaft member is inserted therein. The first link pivots relatively to the second link by the first actuator and the second actuator rotating. The joint structure further includes a pressing member connected to the second shank and configured to press the second rotary member inwardly.

According to this, even if wobbles occur, the wobbles can be eliminated or generation of the wobbles can be suppressed.

Effect of the Disclosure

According to the joint structure for the robot of the present disclosure, even if wobbles occur, the wobbles can be eliminated or generation of the wobbles can be suppressed.

MODE FOR CARRYING OUT THE DISCLOSURE

Figure 1:
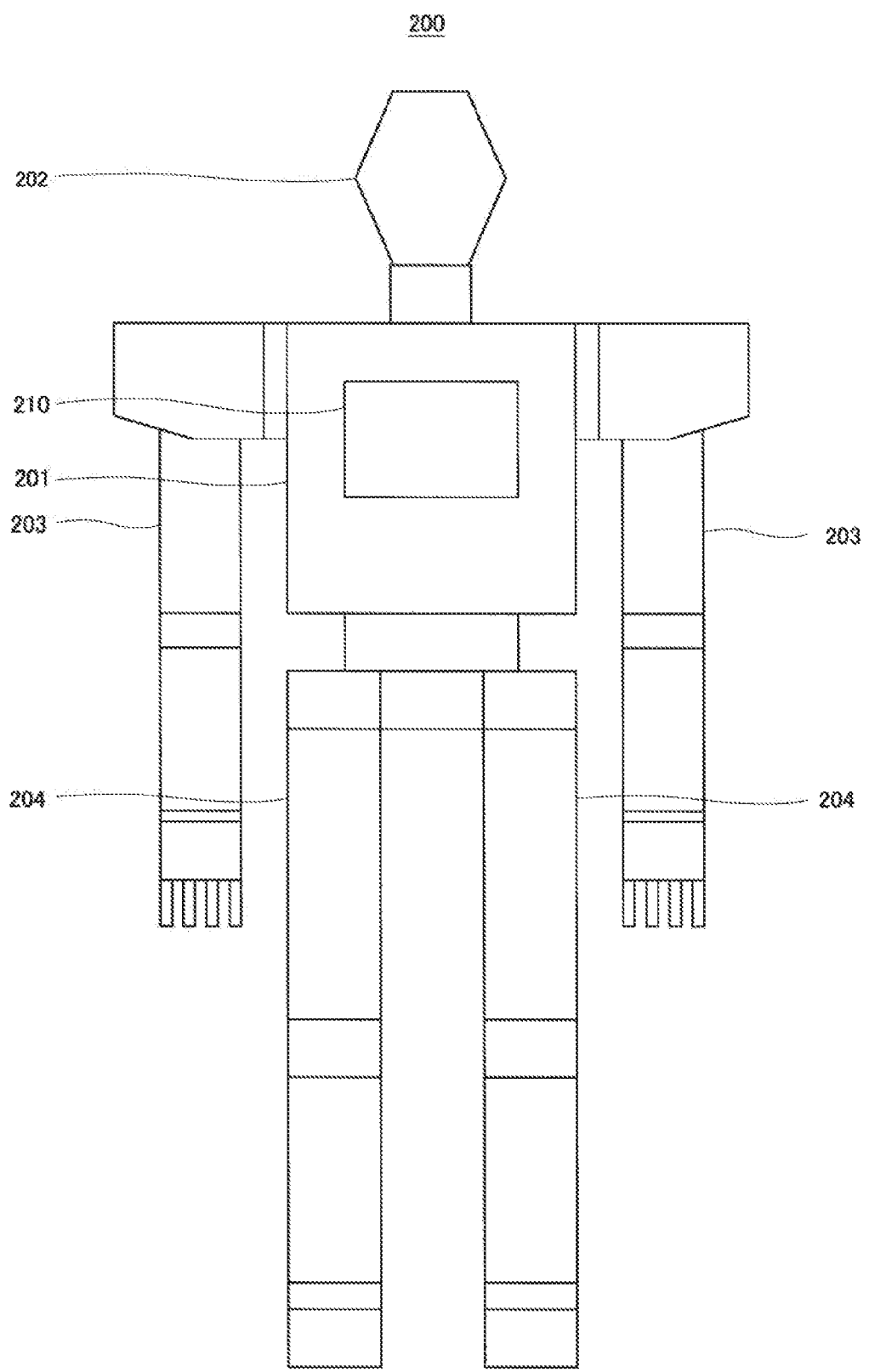
FIG. 1 is a schematic diagram illustrating an outline configuration of a robot provided with a joint structure according to Embodiment 1.

Hereinafter, one embodiment of the present disclosure will be described with reference to the drawings. Note that, throughout the drawings, the same reference characters are assigned to the same or corresponding parts to omit redundant description. Moreover, throughout the drawings, component are selectively illustrated for explaining the present disclosure, and illustration of other components may be omitted. The present disclosure is not limited to the following embodiment.

Embodiment 1

A joint structure for a robot according to Embodiment 1 includes a first link and a second link rotatably coupled to each other via a joint part, and a first actuator and a second actuator. The joint part has a first rotary member disposed so that an axial center thereof is oriented in a first direction and connected to the first link, a pair of second rotary members disposed so that an axial center thereof is oriented in a second direction perpendicular to the first direction, and so as to engage with the first rotary member, and a shaft member having a first shank and a pair of second shanks. The first actuator transmits a rotational movement thereof to one of the second rotary members via a rotary transmitting member. The second actuator transmits a rotational movement thereof to the other second rotary member via the rotary transmitting member. The shaft member is formed so that the first shank is oriented in the first direction and the pair of second shanks are oriented in the second direction. The first rotary member is disposed so that the first shank of the shaft member is inserted therein. The pair of second rotary members are disposed so that they oppose to each other and the second shank of the shaft member is inserted therein. The first link pivots relatively to the second link by the first actuator and the second actuator rotating. The joint structure further includes a pressing member connected to the second shank and configured to press the second rotary member inwardly.

Further, in the joint structure for the robot according to Embodiment 1, the rotary transmitting member may have a first rotary transmitting member connected to the first actuator or the second actuator, and a second rotary transmitting member disposed so that an axial center thereof is oriented in the second direction and so as to engage with the first rotary transmitting member.

Further, in the joint structure for the robot according to Embodiment 1, the pressing member may press the second rotary member via the second rotary transmitting member.

Further, in the joint structure for the robot according to Embodiment 1, a bearing may be disposed between the pressing member and the second rotary transmitting member.

Further, in the joint structure for the robot according to Embodiment 1, the pressing member may be disposed so as to overlap with the second shank, when seen in the second direction.

Moreover, the joint structure for the robot according to Embodiment 1 may further include an attaching member disposed at the second link and configured to contact a base-end part of the second rotary transmitting member, and a fastening member configured to fasten the attaching member and the second link together. The fastening member may be disposed so as not to overlap with the second shank, when seen in the second direction.

Below, one example of the joint structure for the robot according to Embodiment 1 is described with reference to FIGS. 1 and 2.

Configuration of Robot

First, a configuration of the robot provided with the joint structure according to Embodiment 1 is described with reference to FIG. 1.

FIG. 1 is a schematic diagram illustrating an outline configuration of the robot provided with the joint structure according to Embodiment 1.

As illustrated in FIG. 1, a robot 200 includes a body 201, a head 202, a pair of arms 203, a pair of legs 204, and a control device 110 disposed inside the body 201.

The control device 110 includes a processor such as a microprocessor or a CPU, a memory such as a ROM and/or a RAM (not illustrated). The memory stores information on a basic program, various fixed data, etc. The processor controls various operations of the robot 200 by reading and executing software, such as the basic program stored in the memory.

Note that the control device 110 may be comprised of a sole control device 110 which carries out a centralized control, or may be comprised of a plurality of control devices 110 which collaboratively carry out a distributed control. Further, the control device 110 may be comprised of the microcomputer, or may be comprised of a MPU, a PLC (Programmable Logic Controller), a logical circuit, etc.

[Configuration of Joint Structure for Robot]

Figure 2:
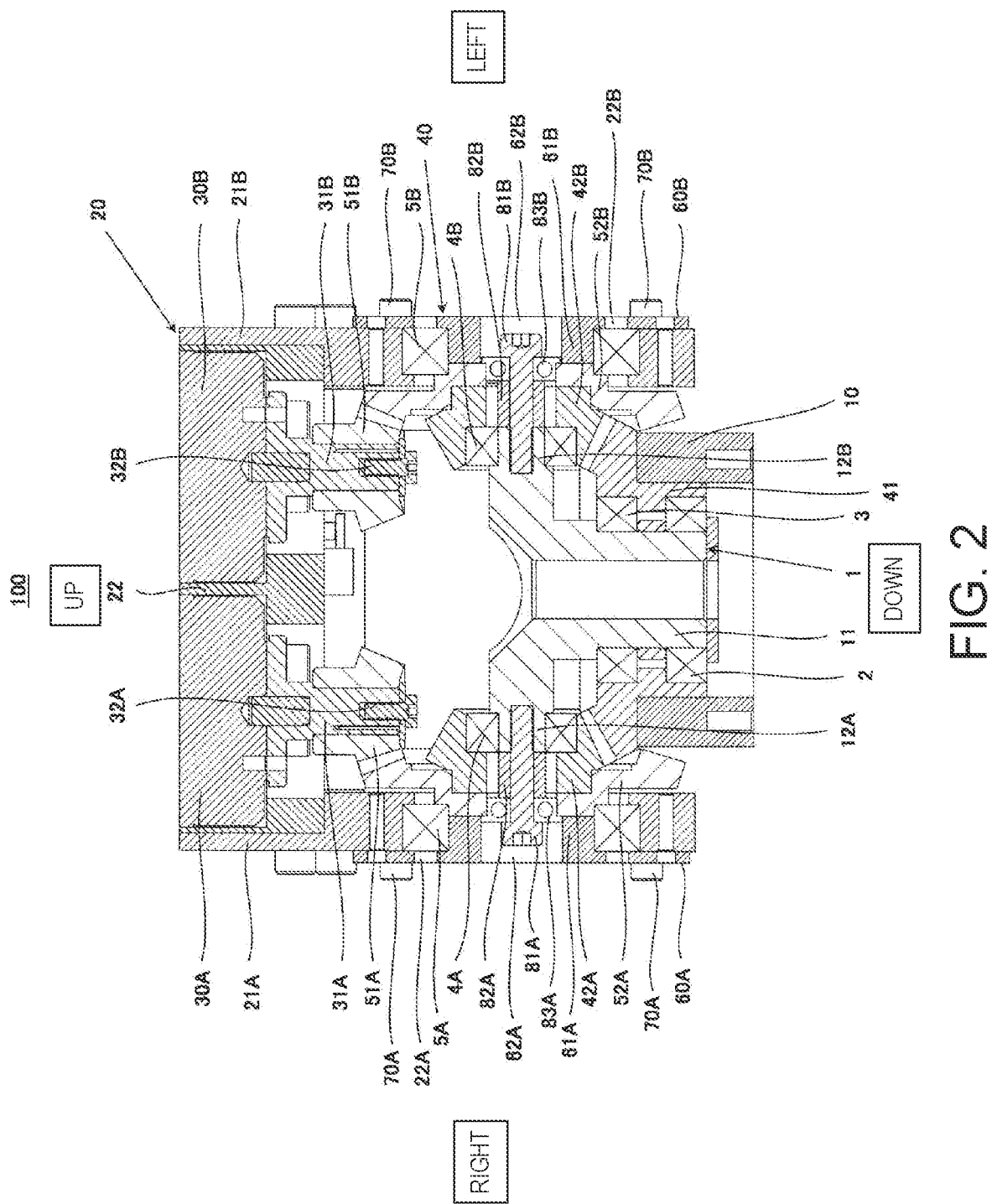
FIG. 2 is a cross-sectional view illustrating an outline configuration of the joint structure for the robot according to Embodiment 1.

FIG. 2 is a perspective view illustrating an outline configuration of the joint structure for the robot according to Embodiment 1. Note that, in FIG. 2, an up-and-down direction and a left-and-right direction in the joint structure for the robot are expressed as an up-and-down direction and a left-and-right direction in the drawing.

As illustrated in FIG. 2, a joint structure 100 for the robot according to Embodiment 1 includes a first link 10, a second link 20, a first actuator 30A, a second actuator 30B, and a joint part 40. The first link 10 and the second link 20 are rotatably coupled to each other via the joint part 40.

Further, in the joint structure 100 for the robot according to Embodiment 1 is configured so that the first link 10 pivots relatively to the second link 20 by the first actuator 30A and the second actuator 30B carrying out rotating operation (rotary motion).

For example, the joint structure 100 for the robot according to Embodiment 1 may be configured such that the first link 10 constitutes a lower-half part of the body of the robot 200, the second link 20 constitutes an upper-half part of the body of the robot 200, and the joint part 40 constitutes a waist joint of the robot. Alternatively, the joint structure 100 may be configured such that, for example, the first link 10 constitutes a hand part of the robot 200, the second link 20 constitutes a forearm part of the robot 200, and the joint part 40 constitutes a wrist joint.

Alternatively, the joint structure 100 may be configured so that, for example, the first link 10 constitutes an upper-leg part of the robot 200, the second link 20 constitutes a lower-leg part of the robot 200, and the joint part 40 constitutes an ankle joint. Alternatively, the joint structure 100 may be configured so that, for example, the first link 10 constitutes an upper-half part of the body of the robot 200, the second link 20 constitutes a head part of the robot 200, and the joint part 40 constitutes a neck joint.

In Embodiment 1, the first link 10 is formed in a box shape, and it is fixed to a lower part of a first rotary member 41 of the joint part 40 via suitable members (for example, fastening members, such as bolts and nuts).

The first rotary member 41 is comprised of a bevel gear, and a first shank 11 of a shaft member 1 is fitted into an inner circumferential surface thereof via bearing members 2 and 3. Ball bearings may be used as the bearing members 2 and 3.

The shaft member 1 is formed substantially in a T-shape, and has the first shank 11 and a pair of second shanks 12A and 12B. The first shank 11 is disposed so that its axial center is oriented in the first direction (here, the up-and-down direction), and a pair of second shanks 12A and 12B are disposed so that their axial centers are oriented in a second direction (here, the left-and-right direction) which is perpendicular to the first direction.

Therefore, the first link 10 can rotate around the first shank 11 relatively to the second link 20 when the first rotary member 41 rotates. Note that the shaft member 1 may be formed in a cross shape.

On the other hand, the second link 20 has a pair of plate-like first members 21A and 21B, and a casing 22. The first members 21A and 21B are disposed so that their principal surfaces oppose to each other. Through-holes 22A and 22B formed in a stepped shape are formed in the principal surfaces of the first members 21A and 21B, respectively.

Further, the casing 22 is disposed in a space between the first members 21A and 21B. The first actuator 30A and the second actuator 30B are disposed in the casing 22 so that they are lined up in the second direction.

Here, the first actuator 30A and the second actuator 30B are each comprised of a servo motor. A first rotary transmitting member 51A is fitted into a shank 31A of the first actuator 30A. The first rotary transmitting member 51A is fixed to the shank 31A by fastening members (here, bolts) 32A. Similarly, a first rotary transmitting member 51B is fitted onto a shank 31B of the second actuator 30B. The first rotary transmitting member 51B is fixed to the shank 31B by fastening members 32B (here, bolts) 32B.

A second rotary transmitting member 52A meshes (engages) with the first rotary transmitting member 51A. The first rotary transmitting member 51A and the second rotary transmitting member 52A are each comprised of a bevel gear. The second rotary transmitting member 52A is disposed so that its axial center is oriented in the second direction, and a through-hole is formed therein. Note that the first rotary transmitting member 51A and the second rotary transmitting member 52A may be referred to as "the rotary transmitting member(s)."

A second rotary member 42A is disposed in a left end part of the second rotary transmitting member 52A. The second rotary member 42A is comprised of a bevel gear, and it is disposed so that its axial center is in agreement with the axial center of the second rotary transmitting member 52A. Further, a through-hole is formed in the second rotary member 42A. The second shank 12A of the shaft member 1 is fitted into an inner circumferential surface of the second rotary member 42A via a bearing member 4A.

Similarly, a second rotary transmitting member 52B meshes (engages) with the first rotary transmitting member 51B. The first rotary transmitting member 51B and the second rotary transmitting member 52B are each comprised of a bevel gear. The second rotary transmitting member 52B is disposed so that its axial center is oriented in the second direction, and a through-hole is formed therein. Note that the first rotary transmitting member 51B and the second rotary transmitting member 52B may be referred to as "the rotary transmitting member(s)."

A second rotary member 42B is disposed in a left end part of the second rotary transmitting member 52B. The second rotary member 42B is comprised of a bevel gear, and it is disposed so that its axial center is in agreement with the axial center of the second rotary transmitting member 52B. Further, a through-hole is formed in the second rotary member 42B. The second shank 12B of the shaft member 1 is fitted into an inner circumferential surface of the second rotary member 42B via a bearing member 4B.

Moreover, a base-end part (here, a right end part) of the second rotary transmitting member 52A is inserted into the through-hole 22A. A plate-like attaching member 60A is disposed at the through-hole 22A so that it covers the through-hole 22A.

A protrusion 61A is provided to the attaching member 60A. The protrusion 61A is formed so that its tip-end face (here, a left end face) contacts the base-end part of the second rotary transmitting member 52A. Further, at the through-hole 22A, a bearing member 5A is disposed so that it contacts the stepped part of the through-hole 22A, an outer circumferential surface of the protrusion 61A, and an outer circumferential surface of the base-end part of the second rotary transmitting member 52A. A ball bearing may be used as the bearing member 5A.

The attaching member 60A is fastened to the first member 21A by a fastening member 70A. Therefore, the second rotary transmitting member 52A and the second rotary member 42A can be pressed to the left (inwardly).

Note that, when seen in the second direction, the fastening member 70A is disposed so that it does not overlap with the second shank 12A. In more detail, the fastening member 70A is disposed so that it is located outside the through-hole 22A.

A through-hole 62A extending in the thickness direction is formed in the protrusion 61A of the attaching member 60A so that it communicates with the through-holes of the second rotary member 42A and the second rotary transmitting member 52A. A pressing member 81A, a collar member 82A, and a bearing member 83A are disposed in the through-hole 62A.

Here, the pressing member 81A is comprised of a fastening member (bolt), and has a head and a shank. The pressing member 81A is disposed so that its axial center of the shank extends in the second direction. That is, when seen in the second direction, the pressing member 81A is disposed so that it overlaps with the second shank 12A. Further, a tip-end part of the shank of the pressing member 81A is connected to a tip-end part of the second shank 12A.

The collar member 82A is formed in a cylindrical shape, and it is disposed so that its tip-end face contacts a tip-end face (a right end face) of the second shank 12A. Further, the shank of the pressing member 81A is inserted into an interior space of the collar member 82A.

The bearing member 83A is disposed between a left end face of the head of the pressing member 81A and a base-end face (a right end face) of the collar member 82A. Here, the bearing member 83A is comprised of a ball bearing with a flange, and this flange part is in contact with the base-end part of the second rotary transmitting member 52A.

Thus, by connecting (threadedly engaging) the pressing member 81A to the second shank 12A, the second rotary member 42A can be pressed inwardly (brought closer to the second rotary member 42B) via the second rotary transmitting member 52A. Thus, it can suppress the generation of wobbles (rattling) between the first rotary transmitting member 51A and the second rotary transmitting member 52A and/or between the second rotary member 42A and the first rotary member 41. Further, even if wobbles occur, the wobbles can be eliminated only by thrusting the pressing member 81A into the second shank 12A.

Note that, in Embodiment 1, although the bearing member 83A is comprised of the ball bearing with the flange, and by the flange part contacting the second rotary transmitting member 52A, the pressing member 81A presses the second rotary transmitting member 52A and the second rotary member 42A, it is not limited to this configuration.

For example, a stepped part may be provided to the base-end part of the second rotary transmitting member 52A, and the bearing member 83A may be disposed at the stepped part. That is, without using the flange part, the pressing member 81A can press the second rotary transmitting member 52A and the second rotary member 42A. In this case, various ball bearings may be used as the bearing member 83A.

Similarly, a base-end part (here, a left end part) of the second rotary transmitting member 52B is inserted into the through-hole 22B. A plate-like attaching member 60B is disposed at through-hole 22B so that it covers the through-hole 22B.

A protrusion 61B is provided to the attaching member 60B. The protrusion 61B is formed so that its tip-end face (here, a right end face) contacts the base-end part of the second rotary transmitting member 52B. Further, at the through-hole 22B, a bearing member 5B is disposed so that it contacts the stepped part of the through-hole 22B, an outer circumferential surface of the protrusion 61B, and an outer circumferential surface of the base-end part of the second rotary transmitting member 52B. A ball bearing may be used as the bearing member 5B.

The attaching member 60B is fastened to the first member 21B by a fastening member 70B. Therefore, the second rotary transmitting member 52B and the second rotary member 42B can be pressed to the right.

Note that, when seen in the second direction, the fastening member 70B is disposed so that it does not overlap with the second shank 12B. In more detail, the fastening member 70B is disposed so that it is located outside the through-hole 22B.

A through-hole 62B extending in the thickness direction is formed in the protrusion 61B of the attaching member 60B so that it communicates with the through-holes of the second rotary member 42B and the second rotary transmitting member 52B. A pressing member 81B, a collar member 82B, and a bearing member 83B are disposed at the through-hole 62B.

Here, the pressing member 81B is comprised of a fastening member (bolt), and has a head and a shank. The pressing member 81B is disposed so that its axial center of the shank extends in the second direction. That is, when seen in the second direction, the pressing member 81B is disposed so that it overlaps with the second shank 12B. Further, a tip-end part of the shank of the pressing member 81B is connected to a tip-end part of the second shank 12B.

The collar member 82B is formed in a cylindrical shape, and it is disposed so that its tip-end face contacts a tip-end face (a left end face) of the second shank 12B. Further, a shank of the pressing member 81B is inserted into an interior space of the collar member 82B.

The bearing member 83B is disposed between a right end face of the head of the pressing member 81B and a base-end face (a left end face) of the collar member 82B. Here, the bearing member 83B is comprised of a ball bearing with a flange, and the flange part is in contact with the base-end part of the second rotary transmitting member 52B.

Thus, by connecting (threadedly engaging) the pressing member 81B to the second shank 12B, the second rotary member 42B can be pressed inwardly (brought closer to the second rotary member 42A) via the second rotary transmitting member 52B. Thus, it can suppress the generation of wobbles (rattling) between the first rotary transmitting member 51B and the second rotary transmitting member 52B, and/or between the second rotary member 42B and the first rotary member 41. Further, even if the wobbles occur, the wobbles can be eliminated only by thrusting the pressing member 81B into the second shank 12B.

Note that, in Embodiment 1, although the bearing member 83B is comprised of the ball bearing with the flange, and by the flange part contacting the second rotary transmitting member 52B, the pressing member 81B presses the second rotary transmitting member 52B and the second rotary member 42B, it is not limited to this configuration.

For example, a stepped part may be provided in the base-end part of the second rotary transmitting member 52B, and the bearing member 83B may be disposed at the stepped part. That is, without using the flange part, the pressing member 81B can press the second rotary transmitting member 52B and the second rotary member 42B. In this case, various ball bearings may be used as the bearing member 83B.

In the joint structure 100 for the robot according to Embodiment 1 configured as described above, by connecting the pressing member 81A to the second shank 12A, the second rotary member 42A can be pressed inwardly (brought closer to the second rotary member 42B) via the second rotary transmitting member 52A.

Thus, in the differential gear device, it can suppress the generation of the wobbles between the first rotary transmitting member 51A and the second rotary transmitting member 52A, and/or between the second rotary member 42A and the first rotary member 41. Further, even if the wobbles occur, the wobbles can be eliminated only by thrusting the pressing member 81A into the second shank 12A. That is, the rigidity of the joint part 40 can be increased.

In the joint structure 100 for the robot according to Embodiment 1, by connecting the pressing member 81B to the second shank 12B, the second rotary member 42B can be pressed inwardly (brought closer to the second rotary member 42A) via the second rotary transmitting member 52B.

Thus, in the differential gear device, it can suppress the generation of the wobbles between the first rotary transmitting member 51B and the second rotary transmitting member 52B, and/or between the second rotary member 42B and the first rotary member 41. Further, even if the wobbles occur, the wobbles can be eliminated only by thrusting the pressing member 81B into the second shank 12B. That is, the rigidity of the joint part 40 can be increased.

Moreover, in the joint structure 100 for the robot according to Embodiment 1, the bearing member 83A is comprised of the ball bearing with the flange, and the flange part contacts the second rotary transmitting member 52A. The pressing member 81A presses the second rotary transmitting member 52A and the second rotary member 42A via the flange part.

Thus, since it is not necessary to provide the stepped part to the second rotary transmitting member 52A, and it is not necessary to form the large through-hole 62A (increase the volume of the through-hole 62A), the joint part 40 can be downsized.

Further, in the joint structure 100 for the robot according to Embodiment 1, the bearing member 83B is comprised of the ball bearing with the flange, and the flange part contacts the second rotary transmitting member 52B. The pressing member 81B presses the second rotary transmitting member 52B and the second rotary member 42B via the flange part.

Thus, since it is not necessary to provide the stepped part to the second rotary transmitting member 52B, and it is not necessary to form the large through-hole 62B (increase the volume of the through-hole 62B), the joint part 40 can be downsized.

Further, in the joint structure 100 for the robot according to Embodiment 1, the attaching member 60A is fastened to the first member 21A by the fastening member 70A. Therefore, the second rotary transmitting member 52A and the second rotary member 42A can be pressed to the left, and the engagement between the first rotary transmitting member 51A and the second rotary transmitting member 52A, and/or the engagement between the second rotary member 42A and the first rotary member 41 can fully be secured. Moreover, since the fastening member 70A is disposed so that it does not overlap with the second shank 12A, the operating range of the joint part 40 can fully be secured.

Further, in the joint structure 100 for the robot according to Embodiment 1, the attaching member 60B is fastened to the first member 21B by the fastening member 70B. Therefore, the second rotary transmitting member 52B and the second rotary member 42B can be pressed to the left, and the engagement between the first rotary transmitting member 51B and the second rotary transmitting member 52B, and/or the engagement between the second rotary member 42B and the first rotary member 41 can fully be secured. Moreover, since the fastening member 70B is disposed so that it does not overlap with the second shank 12B, the operating range of the joint part 40 can fully be secured.

Further, in the joint structure 100 for the robot according to Embodiment 1, when the first rotary member 41 and the second rotary members 42A and 42B are configured so that the number of teeth of the first rotary member 41 is larger than the number of teeth of the second rotary members 42A and 42B, a speed of the pivot operation of the first link 10 with respect to the second link 20 can be increased.

Further, in the joint structure 100 for the robot according to Embodiment 1, when the first rotary member 41 and the second rotary members 42A and 42B are configured so that the number of teeth of the second rotary members 42A and 42B is larger than the number of teeth of the first rotary member 41, the amplitude of the first link 10 which carries out the pivot operation can be reduced corresponding to the rotating operation of the first actuator 30A and the second actuator 30B.

Thus, it is not necessary to dispose an expensive highly-precise rotation sensor or current sensor, and therefore, the joint structure 100 can be reduced in cost, and, as a result, the robot can be reduced in cost. Further, the control of the first actuator 30A and the second actuator 30B by the control device 110 becomes easier.

Note that although in the joint structure 100 for the robot according to Embodiment 1 the bevel gear is used as the rotary transmitting member to transmit the rotational movement of the actuator to the second rotary member, it is not limited to this configuration. Various known mechanisms can be used as the rotary transmitting member, as long as it can transmit the rotational movement of the actuator to the second rotary member, and therefore, it may adopt any type. For example, as disclosed in WO2018/097251A1, using a linear actuator, the rotational movement of the actuator may be converted into the forward and backward movement so as to transmit it to the second rotary member. In this case, a cylinder (for example, a ball-screw mechanism) which constitutes the linear actuator constitutes the rotary transmitting member.

It is apparent for the person skilled in the art that many improvements or other embodiments of the present disclosure are possible from the above description. Therefore, the above description is to be interpreted only as illustration, and it is provided in order to teach the person skilled in the art the best mode that implements the present disclosure. The details of the structures and/or the functions may be changed substantially without departing from the present disclosure.

INDUSTRIAL APPLICABILITY

Since the joint structure for the robot of the present disclosure can eliminate the wobbles or can suppress the generation of the wobbles even if the wobbles occur, it is useful in the field of the industrial robots.

The invention claimed is:

1. A joint structure for a robot, comprising:
a first link and a second link rotatably coupled to each other via a joint part; and
a first actuator and a second actuator,
wherein the joint part has a first rotary member disposed so that an axial center thereof is oriented in a first direction and connected to the first link, a pair of second rotary members disposed so that an axial center thereof is oriented in a second direction perpendicular to the first direction, and so as to engage with the first rotary member, and a shaft member having a first shank and a pair of second shanks,
wherein the first actuator transmits a rotational movement thereof to one of the second rotary members via a rotary transmitting member,
wherein the second actuator transmits a rotational movement thereof to the other second rotary member via another rotary transmitting member,
wherein the shaft member is formed so that the first shank is oriented in the first direction and the pair of second shanks are oriented in the second direction,
wherein the first rotary member is disposed so that the first shank of the shaft member is inserted therein,
wherein the pair of second rotary members are disposed so that they oppose to each other and the second shank of the shaft member is inserted therein,
wherein the first link pivots relatively to the second link by the first actuator and the second actuator rotating, and
wherein the joint structure further comprises pressing members threadedly engaged respectively with each of the second shanks and capable of pressing each of the pair of the second rotary members inwardly.

2. The joint structure of claim 1, wherein the rotary transmitting member has a first rotary transmitting member connected to the first actuator or the second actuator, and a second rotary transmitting member disposed so that an axial center thereof is oriented in the second direction and so as to engage with the first rotary transmitting member.

3. The joint structure of claim 2, wherein the pressing members press the second rotary members via the second rotary transmitting member.

4. The joint structure of claim 3, wherein a bearing is disposed between the pressing member and the second rotary transmitting member.

5. The joint structure of claim 4, wherein the pressing members are disposed so as to overlap with each of the second shanks, when seen in the second direction.

6. The joint structure of claim 5, further comprising:
an attaching member disposed at the second link and contacting a base-end part of the second rotary transmitting member; and
a fastening member fastening the attaching member and the second link together,
wherein the fastening member is disposed so as not to overlap with each of the second shanks, when seen in the second direction.

7. The joint structure of claim 4, further comprising:
an attaching member disposed at the second link and contacting a base-end part of the second rotary transmitting member; and
a fastening member fastening the attaching member and the second link together,
wherein the fastening member is disposed so as not to overlap with each of the second shanks, when seen in the second direction.

8. The joint structure of claim 3, wherein the pressing members are disposed so as to overlap with each of the second shanks, when seen in the second direction.

9. The joint structure of claim 8, further comprising:
an attaching member disposed at the second link and contacting a base-end part of the second rotary transmitting member; and
a fastening member fastening the attaching member and the second link together,
wherein the fastening member is disposed so as not to overlap with each of the second shanks, when seen in the second direction.

10. The joint structure of claim 3, further comprising:
an attaching member disposed at the second link and contacting a base-end part of the second rotary transmitting member; and
a fastening member fastening the attaching member and the second link together, wherein the fastening member is disposed so as not to overlap with each of the second shanks, when seen in the second direction.

11. The joint structure of claim 2, wherein the pressing members are disposed so as to overlap with each of the second shanks, when seen in the second direction.

12. The joint structure of claim 11, further comprising:
an attaching member disposed at the second link and contacting a base-end part of the second rotary transmitting member; and
a fastening member fastening the attaching member and the second link together,
wherein the fastening member is disposed so as not to overlap with each of the second shanks, when seen in the second direction.

13. The joint structure of claim 2, further comprising:
an attaching member disposed at the second link and contacting a base-end part of the second rotary transmitting member; and
a fastening member fastening the attaching member and the second link together,
wherein the fastening member is disposed so as not to overlap with each of the second shanks, when seen in the second direction.

14. The joint structure of claim 1, wherein the pressing members are disposed so as to respectively overlap with each of the second shanks, when seen in the second direction.

15. The joint structure of claim 14, further comprising:
an attaching member disposed at the second link and contacting a base-end part of the second rotary transmitting member; and
a fastening member fastening the attaching member and the second link together,
wherein the fastening member is disposed so as not to overlap with each of the second shanks, when seen in the second direction.

16. The joint structure of claim 1, further comprising:
an attaching member disposed at the second link and contacting a base-end part of the second rotary transmitting member; and
a fastening member fastening the attaching member and the second link together,
wherein the fastening member is disposed so as not to overlap with of the second shanks, when seen in the second direction.

* * * * *